Sept. 3, 1957    H. R. NEDWIDEK    2,804,862
INTERNAL COMBUSTION ENGINE
Filed July 7, 1953    2 Sheets-Sheet 1
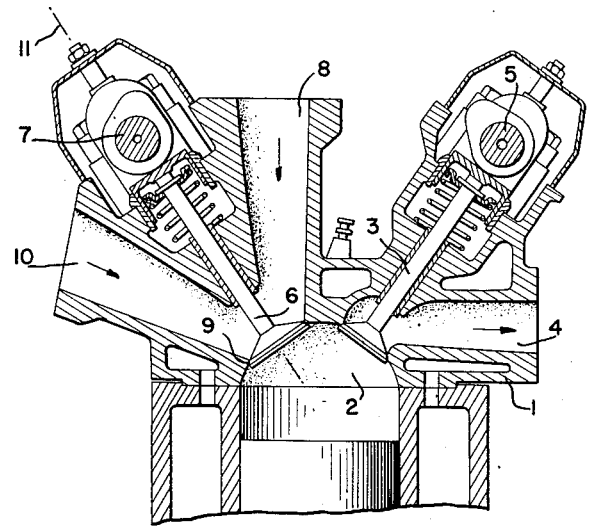
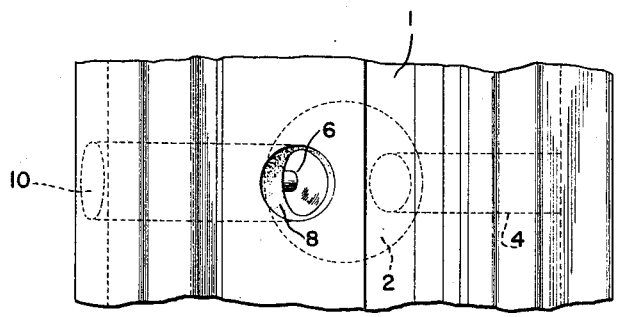
INVENTOR
HANS R. NEDWIDEK
BY *Dicke, Padlow and Craig*
ATTORNEYS Sept. 3, 1957  H. R. NEDWIDEK  2,804,862
INTERNAL COMBUSTION ENGINE
Filed July 7, 1953  2 Sheets-Sheet 2

INVENTOR
HANS R. NEDWIDEK
BY
ATTORNEYS

United States Patent Office 2,804,862
Patented Sept. 3, 1957

2,804,862

INTERNAL COMBUSTION ENGINE

Hans R. Nedwidek, Stuttgart, Germany, assignor to Daimler-Benz Aktiengesellschaft, Stuttgart-Unterturkheim, Germany Application July 7, 1953, Serial No. 366,518

Claims priority, application Germany July 9, 1952

4 Claims. (Cl. 123—75)

The present invention relates to combustion engines and more particularly to such engines in which the intake valves extend from the cylinder head in downward direction, and wherein two intake valves may be provided for each cylinder and the intake ports or channels are of relatively small cross-sectional size.

For filling the cylinders adequately with a gas and air mixture, combustion engines, and especially the self-intaking kind, require as large intake cross sections as possible. High efficiency engines, for example, have therefore been provided with two intake valves suspended one beside the other within the head of each cylinder. Although such an arrangement produces the advantage of obtaining the largest possible intake cross section at the seats of the intake valves, it has been found that the intake openings for each valve, which are then of smaller size, require a relatively large part of the space provided for the respective intake channel for housing the valve shafts and especially the guides arranged around the valve stems.

The object of the present invention is to overcome the above mentioned disadvantages, and it is a feature of the invention to provide every intake valve with two intake channels which are suitably arranged to provide the easiest possible flow and meet immediately above and in front of the respective valve seat.

It is another feature of the present invention to provide two intake channels of different size and, in engines having a carburetor, to use the smaller channel for a supplementary air intake for regulating the mixture supplied to the cylinder.

Further objects and features of the invention will become apparent from the following description when taken in connection with the accompanying drawing which shows, for purposes of illustration only, several embodiments in accordance with the present invention, and wherein:

Figure 1 is a vertical cross sectional view through the cylinder head of a combustion engine according to the present invention having one exhaust valve and one intake valve for each cylinder.

Figure 2 is a top plan view of the arrangement according to Figure 1 in accordance with the present invention.

Figure 4:
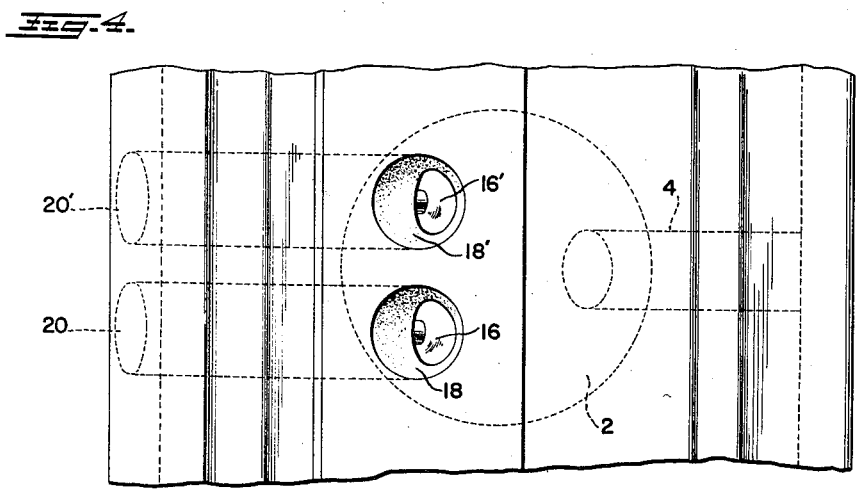
Figure 5:
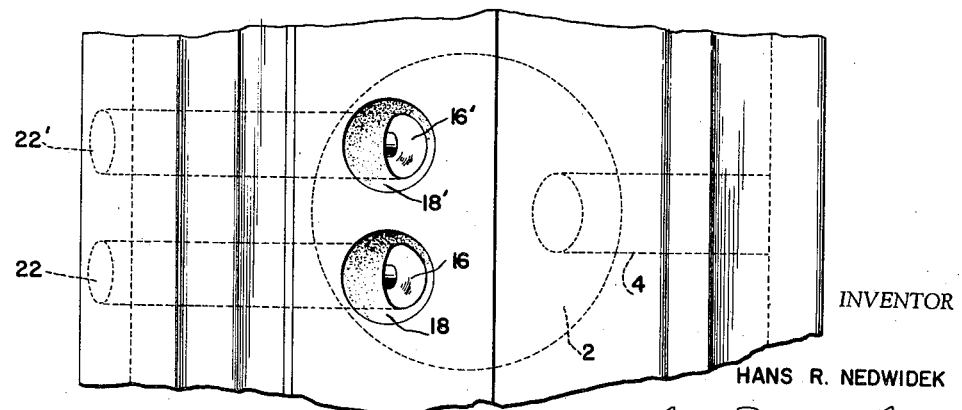

Figure 4 is a top plan view similar to Figure 2 of still another embodiment in accordance with the present invention in which two inlet valves are used with each cylinder, each inlet valve being provided with two inlet channels of equal cross section, and Figure 5 is a top plan view similar to Figure 4 of a modified embodiment wherein the two inlet channels of each inlet valve are of different cross section.

In the drawing, the cylinder head 1 of a carburetor engine includes a combustion chamber 2 and an exhaust valve 3 suspended at an angle into said chamber, and an exhaust channel 4 leading from the inclined valve seat toward the outside. The valve 3 is operated and controlled in the usual manner by a cam shaft 5. The intake valve 6, the movement of which is controlled by the cam shaft 7, is likewise suspended from above and likewise opens at an angle into the combustion chamber 2. An approximately vertically extending intake channel 8 leads to the valve 6 and immediately in front of the valve seat 9 meets a second intake channel 10 which lies approximately horizontally and opposite to the exhaust channel 4. Both intake channels 8 and 10 are of equal size and substantially rectilinear within the cylinder head 1, as shown in the drawing, and are arranged symmetrically relative to the center line 11 of the intake valve to permit the best possible flow.

Figure 3:
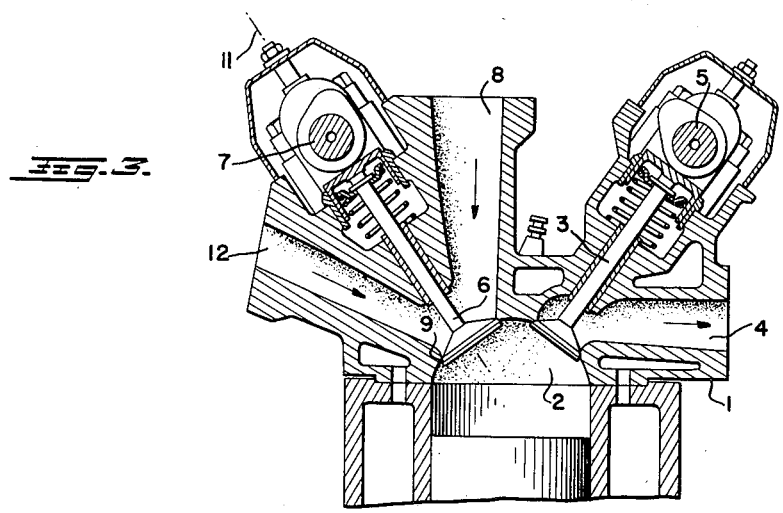
Figure 3 is a vertical cross sectional view similar to Figure 1 of a further embodiment of a cylinder head in accordance with the present invention in which the two intake channels associated with each valve are of different cross section.

The two intake channels 8 and 10 may also be of different size as shown in the embodiment according to Figure 3 wherein two inlet channels 8 and 12 lead to the inlet valve 6 of which the inlet channel 8 is of larger cross section than the inlet channel 12. The intake channel 8 of larger cross section is used for the intake of the usual gasoline-air mixture while the intake channel 12 of narrow cross section serves as supplementary air intake so that during suitable instances, for example, while traveling along a long level road and with a relatively lean mixture, the gasoline consumption will be considerably reduced especially if the air flowing in through the narrower intake channel is preheated. Also in such case it is advisable to arrange the intake channels symmetrically relative to the center line 11 of the intake valve.

Figure 4 illustrates an embodiment similar to Figure 2 wherein each combustion chamber 2 is provided with two intake valves 16 and 16' located side by side and one exhaust valve which controls the exhaust channel 4. Each intake valve 16 and 16' is provided with two intake channels 18 and 20 and 18' and 20', respectively, in a manner similar to the arrangement of the intake channels 8 and 10 of Figure 1. The intake channels 18 and 20 and the intake channels 18' and 20' cooperate with the intake valves 16 and 16' respectively in a manner identical to that illustrated in Figure 1.

Figure 5 illustrates a modification of the embodiment illustrated in Figure 4 in that the intake valve 16 is associated with intake channels 18 and 22 while the intake valve 16' is associated with intake channels 18' and 22' in a manner similar to Figure 3 whereby intake channels 22 and 22' are of smaller cross section than intake channels 18 and 18' respectively.

The present invention is not limited to carburetor type engines but may also be used with injection type engines. In addition to air, another gaseous medium may be supplied to the cylinders which may consist of a mixture of gases whereby one of the two intake channels 8 or 10, 8 or 12, 18 or 20, and 18 or 22 is preferably used for supplying the additional gaseous medium.

I claim:

1. An internal combustion engine comprising a cylinder, a cylinder head, a piston in said cylinder, at least one air-intake valve and an exhaust valve in said cylinder head and extending in a substantially downward direction, two substantially rectilinear and separately supplied intake channels in said cylinder head leading to said intake valve, and a valve seat for said intake valve, said channels being located about said intake valve and joining each other immediately above said valve seat, one of said separately supplied intake channels being adapted to be connected to a source for conducting a gas and air mixture therefrom to said cylinder, while the other of said intake channels is designed for conducting air current to said cylinder.

2. An internal combustion engine comprising a cylinder, a cylinder head, a piston in said cylinder, two inlet valves and an outlet valve for said cylinder in said cylinder head, and two essentially rectilinear inlet channels separately supplied and leading to each of said inlet valves and provided with a valve seat for each inlet valve, two of said channels each being arranged about a respective one of said inlet valves and joining directly above the valve seat thereof, one of the inlet channels of each valve being adapted to be connected with a source of fuel-air mixture to conduct a fuel-air mixture to said cylinder, the other inlet channel of each valve serving for conducting an air stream to said cylinder.

3. An internal combustion engine according to claim 2 wherein the inlet channels are of different cross section, the larger inlet channels of one inlet valve being adapted to be connected with a source of fuel-air mixture to conduct a fuel-air mixture to said cylinder while the other inlet channel having a smaller cross section serves for conducting an air stream to said cylinder.

4. An internal combustion engine comprising a cylinder, a cylinder head, a piston in said cylinder, at least one air intake valve and an exhaust valve in said cylinder head and extending in a substantially downward direction, two rectilinear intake channels in said cylinder head leading to said intake valve, and a valve seat for said intake valve, said channels being located about said intake valve and joining each other immediately above said valve seat, said two intake channels being angularly disposed to one another at an acute angle and arranged substantially symmetrically relative to the axis of said intake valve, said two intake channels being of different cross-sectional size and the larger of said two intake channels being adapted to be connected to a source of gas and air mixture for conducting a gas and air mixture therefrom to said cylinder, while the smaller one is designed for conducting an air current to said cylinder.

References Cited in the file of this patent

UNITED STATES PATENTS

| | | |
|---|---|---|
| 1,563,789 | Redrup | Dec. 1, 1925 |
| 1,687,082 | Cole | Oct. 9, 1928 |
| 1,970,382 | Laubender | Aug. 14, 1934 |
| 2,063,362 | Barkeij | Dec. 8, 1936 |
| 2,242,990 | Brown | May 20, 1941 |
| 2,669,984 | Marchal et al. | Feb. 23, 1954 |

FOREIGN PATENTS

| | | |
|---|---|---|
| 211,464 | Great Britain | Feb. 6, 1924 |